United States Patent
Choi et al.

(10) Patent No.: US 10,348,536 B2
(45) Date of Patent: Jul. 9, 2019

(54) DATA TRANSMISSION DEVICE FOR MODULATING AMPLITUDE OF PAM-4 SIGNAL USING TOGGLE SERIALIZER AND METHOD OF OPERATING THE SAME

(71) Applicant: INDUSTRY-ACADEMIC COOPERATION FOUNDATION, YONSEI UNIVERSITY, Seoul (KR)

(72) Inventors: Woo Young Choi, Seoul (KR); Dae Hyun Kwon, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 15/886,297

(22) Filed: Feb. 1, 2018

(65) Prior Publication Data
US 2018/0219706 A1 Aug. 2, 2018

(30) Foreign Application Priority Data
Feb. 2, 2017 (KR) ........................ 10-2017-0015048

(51) Int. Cl.
*H04L 25/49* (2006.01)
*H04B 10/516* (2013.01)
*H04B 10/524* (2013.01)

(52) U.S. Cl.
CPC ..... *H04L 25/4917* (2013.01); *H04B 10/5167* (2013.01); *H04B 10/524* (2013.01)

(58) Field of Classification Search
CPC ............ H04L 25/4917; H04B 10/5167; H04B 10/524

USPC ......................................... 398/189, 188, 202
See application file for complete search history.

(56) References Cited

U.S. PATENT DOCUMENTS

| | | | | |
|---|---|---|---|---|
| 7,093,145 | B2 * | 8/2006 | Werner | H04L 25/03006 713/300 |
| 9,553,673 | B1 * | 1/2017 | Nagarajan | H03M 1/682 |
| 9,911,469 | B1 * | 3/2018 | Hollis | G11C 5/14 |
| 2002/0091948 | A1 * | 7/2002 | Werner | G11C 7/1051 713/300 |

(Continued)

FOREIGN PATENT DOCUMENTS

| | | |
|---|---|---|
| KR | 10-2000-0064702 A | 11/2000 |
| KR | 10-2009-0001356 A | 1/2009 |
| KR | 10-1543704 B1 | 8/2015 |

OTHER PUBLICATIONS

Communication dated Jun. 28, 2018, issued by the Korean Patent Office in counterpart Korean Patent Application No. 10-2017-0015048.

*Primary Examiner* — Oommen Jacob
(74) *Attorney, Agent, or Firm* — Sughrue Mion, PLLC

(57) ABSTRACT

Disclosed are a data transmission device for modulating the amplitude of a PAM-4 signal using a toggle serializer and a method of operating the same. In accordance with an embodiment of the present disclosure, the data transmission device includes a toggle serializer configured to generate at least one toggle signal by detecting logic level change of first and second signals from a Pulse Amplitude Modulation (PAM) signal including the first and second signals; and a driver configured to modulate an amplitude of the PAM signal by combining the first signal, the second signal, and the at least one toggle signal.

13 Claims, 7 Drawing Sheets

(56) References Cited

U.S. PATENT DOCUMENTS

| | | | |
|---|---|---|---|
| 2003/0070126 A1* | 4/2003 | Werner | G01R 31/31715 714/715 |
| 2003/0093713 A1* | 5/2003 | Werner | G01R 31/31715 714/25 |
| 2003/0190001 A1* | 10/2003 | Gregorian | H03L 7/0891 375/361 |
| 2004/0109510 A1* | 6/2004 | Bessios | H04L 25/4915 375/286 |
| 2005/0259772 A1* | 11/2005 | Voutilainen | H04L 7/0083 375/353 |
| 2006/0181733 A1* | 8/2006 | Yokoyama | H04N 1/001 358/1.15 |
| 2011/0311008 A1* | 12/2011 | Slezak | H03M 9/00 375/353 |
| 2014/0055583 A1* | 2/2014 | Kato | H04N 7/01 348/65 |
| 2016/0006596 A1* | 1/2016 | Dickson | H04L 27/364 375/298 |
| 2016/0173274 A1* | 6/2016 | Choi | H04L 25/4904 375/362 |
| 2016/0182080 A1* | 6/2016 | Vasani | H03M 1/002 341/145 |
| 2017/0257168 A1* | 9/2017 | Gopalakrishnan | H04B 10/541 |

\* cited by examiner

DATA TRANSMISSION DEVICE FOR MODULATING AMPLITUDE OF PAM-4 SIGNAL USING TOGGLE SERIALIZER AND METHOD OF OPERATING THE SAME

CROSS-REFERENCE TO RELATED APPLICATION

This application claims the priority benefit of Korean Patent Application No. 10-2017-0015048, filed on Feb. 2, 2017 in the Korean Intellectual Property Office, the disclosure of which is incorporated herein by reference.

BACKGROUND OF THE DISCLOSURE

Field of the Disclosure

The present disclosure relates to a data transmission device for modulating the amplitude of a 4-level Pulse Amplitude Modulation (PAM-4) signal using a toggle serializer and a method of operating the same, more particularly to a data transmission device for modulating the amplitude of a PAM-4 signal by generating at least one toggle signal according to logic level change in a Most Significant Bit (MSB) signal and Least Significant Bit (LSB) signal included in a PAM-4 signal and combining the at least one toggle signal with a PAM-4 signal, and a method of operating the same.

Description of the Related Art

Recently, as the use of multimedia data communication has rapidly increased, high-speed data transmission of high-capacity data is required, and the operation speed has reached 1 Gb/s or more. Accordingly, a Pulse-Amplitude Modulation (PAM) manner, which is more advantageous, at high speed, than high-speed data transmission adopting a conventional Non-Return-to-Zero (NRZ) manner, is widely used.

In particular, a PAM-4 transmission manner has an advantage of being able to operate at about 2 times slower speed in transmitting the same data amount as compared with existing NRZ data transmission manner. However, despite such an advantage regarding speed, electronic channels, such as a Printed Circuit Board (PCB) transmission line, still cause speed limitations in data transmission.

To address such a problem, a pre-emphasis function among equalizing schemes (e.g., pre-emphasis, a continuous time linear equalizer, a decision feedback equalizer, etc.) which have been used for NRZ data transmission is attracting attention.

However, an existing pre-emphasis function is not suitable for a PAM-4 signal. To address this, a pre-emphasis function for a PAM-4 signal has been performed using two structures configured to perform an existing pre-emphasis function. However, this method has a problem of high power consumption and that a large chip area is required.

To address the aforementioned problems, there is a need for a technology to perform a pre-emphasis function for a PAM-4 signal which provides a chip area gain while reducing power consumption.

SUMMARY OF THE DISCLOSURE

Therefore, the present disclosure has been made in view of the above problems, and it is one object of the present disclosure to provide a data transmission device for modulating the amplitude of a PAM-4 signal using a toggle serializer and a method of operating the same.

It is another object of the present disclosure to provide a data transmission device detecting logic level change in an MSB signal and LSB signal to generate at least one toggle signal, and a method of operating the same.

It is another object of the present disclosure to provide a data transmission device combining an MSB signal, an LSB signal, and at least one toggle signal to modulate the amplitude of a PAM-4 signal related to the MSB signal and the LSB signal, and a method of operating the same.

It is yet another object of the present disclosure to provide a data transmission device controlling a gain according to amplitude modulation of a PAM-4 signal by controlling a supply voltage of inverters into which at least one toggle signal output from a serial conversion modulator is input, and a method of operating the same.

In accordance with an aspect of the present disclosure, the above and other objects can be accomplished by the provision of a data transmission device, including a toggle serializer configured to generate at least one toggle signal by detecting logic level change of first and second signals from a Pulse Amplitude Modulation (PAM) signal including the first and second signals; and a driver configured to modulate an amplitude of the PAM signal by combining the first signal, the second signal, and the at least one toggle signal.

According to an embodiment of the present disclosure, the data transmission device may generate a first toggle signal of the at least one toggle signal when a logic level of the first signal rises, may generate a second toggle signal of the at least one toggle signal when the logic level of the first signal falls, may generate a third toggle signal of the at least one toggle signal when a logic level of the second signal rises, and may generate a fourth toggle signal of the at least one toggle signal when the logic level of the second signal falls.

According to an embodiment of the present disclosure, the first signal may include a Most Significant Byte (MSB) signal, and the second signal includes a Least Significant Byte (LSB) signal.

According to an embodiment of the present disclosure, the first toggle signal may include a toggle-rising signal related to the MSB signal, the second toggle signal may include a toggle-falling signal related to the MSB signal, the third toggle signal may include a toggle-rising signal related to the LSB signal, and the fourth toggle signal may include a toggle-falling signal related to the LSB signal.

According to an embodiment of the present disclosure, the toggle serializer may further include a signal aligner configured to respectively align the first signal and the second signal at a predetermined phase interval.

According to an embodiment of the present disclosure, the data transmission device may generate the first toggle signal when a first logic level is negation and a second logic level is affirmation, upon detection of logic level change in the first signal; may generate the second toggle signal when the first logic level is affirmation and the second logic level is negation, upon detection of logic level change in the first signal; upon detection of logic level change in the first signal; may generate the third toggle signal when a third logic level is negation and a fourth logic level is affirmation, upon detection of logic level change in the second signal; and may generate the fourth toggle signal when the first logic level is affirmation and the second logic level is negation, upon detection of logic level change in the second signal.

According to an embodiment of the present disclosure, the first logic level may be located before the second logic level on a time axis representing logic level change in the first signal, and the third logic level may be located before the fourth logic level on a time axis representing logic level change in the second signal.

According to an embodiment of the present disclosure, an amplitude of the PAM signal may be modulated by adding the first and third toggle signals to a combined value of the first and second signals in a first time section in which a logic level of the first signal and a logic level of the second signal rise; an amplitude of the PAM signal may be modulated by adding the first and fourth toggle signals to a combined value of the first and second signals in a second time section in which a logic level of the first signal rises and a logic level of the second signal falls; an amplitude of the PAM signal may be modulated by adding the second and third toggle signals to a combined value of the first and second signals in a third time section in which a logic level of the first signal falls and a logic level of the second signal rises; and an amplitude of the PAM signal may be modulated by adding the second and fourth toggle signals to a combined value of the first and second signals in a fourth time section in which a logic level of the first signal and a logic level of the second signal fall.

According to an embodiment of the present disclosure, the data transmission device may increases the amplitude of the PAM signal by adding at least one of the first and third toggle signals to the combined value of the first and second signals; and may reduce the amplitude of the PAM signal by adding at least one of the second and fourth toggle signals to the combined value of the first and second signals.

According to an embodiment of the present disclosure, the data transmission device may maintain the amplitude of the PAM signal when the first and fourth toggle signals are added to the combined value of the first and second signals.

According to an embodiment of the present disclosure, the data transmission device may further include at least one toggle modulator configured to receive an input of the at least one toggle signal.

According to an embodiment of the present disclosure, the data transmission device may control a gain according to amplitude modulation of the PAM signal by controlling voltage supplied to the at least one toggle modulator.

In accordance with another aspect of the present disclosure, there is provided a method of operating a data transmission device, the method including generating at least one toggle signal by detecting logic level change of first and second signals from a PAM signal including the first and second signals by a toggle serializer; and modulating an amplitude of the PAM signal by combining the first signal, the second signal, and the at least one toggle signal by a driver.

According to an embodiment of the present disclosure, the method may include generating a first toggle signal of the at least one toggle signal by the toggle serializer when a logic level of the first signal rises; generating a second toggle signal of the at least one toggle signal by the toggle serializer when the logic level of the first signal falls; generating a third toggle signal of the at least one toggle signal by the toggle serializer when a logic level of the second signal rises; and generating a fourth toggle signal of the at least one toggle signal by the toggle serializer when the logic level of the second signal falls.

According to an embodiment of the present disclosure, the method may include modulating an amplitude of the PAM signal by adding the first and third toggle signals to a combined value of the first and second signals in a first time section, in which a logic level of the first signal and a logic level of the second signal rise, by the driver;

modulating an amplitude of the PAM signal by adding the first and fourth toggle signals to a combined value of the first and second signals in a second time section, in which a logic level of the first signal rises and a logic level of the second signal falls, by the driver;

modulating an amplitude of the PAM signal by adding the second and third toggle signals to a combined value of the first and second signals in a third time section, in which a logic level of the first signal falls and a logic level of the second signal rises, by the driver; and modulating an amplitude of the PAM signal by adding the second and fourth toggle signals to a combined value of the first and second signals in a fourth time section, in which a logic level of the first signal and a logic level of the second signal fall, by the driver.

According to an embodiment of the present disclosure, the method may include controlling a gain according to amplitude modulation of the PAM signal by controlling voltage, which is supplied to at least one toggle modulator receiving an input of the at least one toggle signal, by the driver.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE DISCLOSURE

Figure 1A:
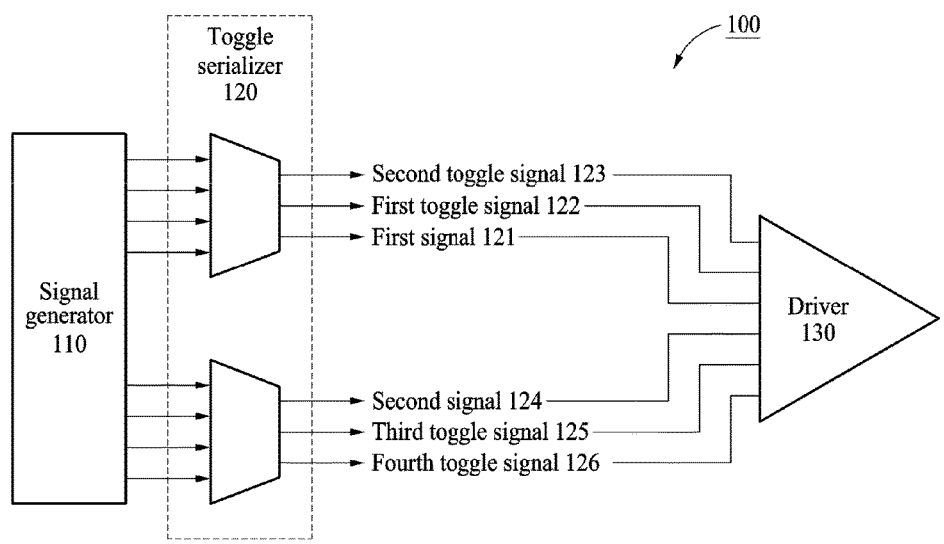
FIG. 1A illustrates a block diagram of a data transmission device according to an embodiment of the present disclosure.

The present disclosure will now be described more fully with reference to the accompanying drawings, in which exemplary embodiments of the disclosure are shown.

This disclosure, however, should not be construed as limited to the exemplary embodiments and terms used in the exemplary embodiments, and should be understood as including various modifications, equivalents, and substituents of the exemplary embodiments.

In the description of embodiments of the present disclosure, certain detailed explanations of related known functions or constructions are omitted when it is deemed that they may unnecessarily obscure the essence of the disclosure.

In addition, the terms used in the specification are defined in consideration of functions used in the present disclosure, and can be changed according to the intent or conventionally used methods of clients, operators, and users. Accordingly, definitions of the terms should be understood on the basis of the entire description of the present specification.

In the drawings, like reference numerals in the drawings denote like elements.

As used herein, the singular forms "a," "an" and "the" are intended to include the plural forms as well, unless context clearly indicates otherwise.

Expressions such as "A or B" and "at least one of A and/or B" should be understood to include all possible combinations of listed items.

Expressions such as "a first," "the first," "a second" and "the second" may qualify corresponding components irrespective of order or importance and may be only used to distinguish one component from another component without being limited to the corresponding components.

In the case in which a (e.g., first) component is referred as "(functionally or communicatively) connected" or "attached" to another (e.g., second) component, the first component may be directly connected to the second component or may be connected to the second component via another component (e.g., third component).

In the specification, the expression " . . . configured to . . . (or set to)" may be used interchangeably, for example, with expressions, such as " . . . suitable for . . . ," " . . . having ability to . . . ," " . . . modified to . . . ," " . . . manufactured to . . . ," " . . . enabling to . . . ," or " . . . designed to . . . ," in the case of hardware or software depending upon situations.

In any situation, the expression "a device configured to" may refer to a device configured to operate "with another device or component."

For examples, the expression "a processor configured (or set) to execute A, B, and C" may refer to a specific processor performing a corresponding operation (e.g., embedded processor), or a general-purpose processor (e.g., CPU or application processor) executing one or more software programs stored in a memory device to perform corresponding operations.

In addition, the expression "or" means "inclusive or" rather than "exclusive or".

That is, unless otherwise mentioned or clearly inferred from context, the expression "x uses a or b" means any one of natural inclusive permutations.

FIG. 1A illustrates a block diagram of a data transmission device according to an embodiment of the present disclosure.

In particular, FIG. 1A exemplifies constituents of a data transmission device 100.

Referring to FIG. 1A, the data transmission device 100 includes a toggle serializer 120 and a driver 130.

According to an embodiment of the present disclosure, the toggle serializer 120 may detect logic level change of the first and second signals 121 and 124 from a pulse amplitude modulation signal including the first and second signals 121 and 124 to generate at least one toggle signal. For example, the at least one toggle signal may include a toggling signal.

For example, the first signal 121 may include an MSB signal among the pulse amplitude modulation signal, and the second signal 124 may include an LSB signal thereamong.

When the toggle serializer 120 detects that a logic level of the first signal 121 rises, the toggle serializer 120 generates a first toggle signal 122. When the toggle serializer 120 detects that a logic level of the first signal 121 falls, the toggle serializer 120 may generate a second toggle signal.

For example, the first toggle signal 122 may include a toggle-rising signal related to the MSB signal, and a second toggle signal 123 may include a toggle-falling signal related to the MSB signal.

In addition, when the toggle serializer 120 detects that a logic level of the second signal 124 rises, the toggle serializer 120 generates a third toggle signal 125. When the toggle serializer 120 detects that a logic level of the second signal 124 falls, the toggle serializer 120 may generate a fourth toggle signal 126.

For example, the third toggle signal 125 may include a toggle-rising signal related to the LSB signal, and the fourth toggle signal 126 may include a toggle-falling signal related to the LSB.

That is the toggle serializer 120 may detect logic level change in the first and second signals 121 and 124, which are included in a pulse amplitude modulation signal input in the toggle serializer 120, to generate a toggle-rising or toggle-falling signal related to the first signal 121 and a toggle-rising or toggle-falling signal related to the second signal 124.

In addition, the toggle serializer 120 may transmit at least one toggle signal generated based on logic level change in the first signal 121, the second signal 124, and the first and second signals 121 and 124 to the driver 130.

According to an embodiment of the present disclosure, the driver 130 may combine the first signal 121, the second signal 124, and the at least one toggle signal to modulate the amplitude of the pulse amplitude modulation signal.

That is, the driver 130 may increase the amplitude of the pulse amplitude modulation signal by adding the first and third toggle signals 122 and 125 to a combined value of the first and second signals 121 and 124 in a first time section in which a logic level of the first signal 121 and a logic level of the second signal 124 rise.

For example, when the combined value of the first and second signals 121 and 124 is "11,", the driver 130 may modulate the amplitude such that the combined value of the first and second signals 121 and 124, to which the first and third toggle signals 122 and 125 have been added, increases by a block of the first and third toggle signals 122 and 125.

Additionally, the driver 130 may modulate the amplitude of the pulse amplitude modulation signal by adding the first and fourth toggle signals 122 and 126 to a combined value of the first and second signals 121 and 124 in a second time section in which a logic level of the first signal 121 rises and a logic level of the second signal 124 falls.

However, since the first toggle signal 121 is a toggle-rising signal and the fourth toggle signal 126 is a toggle-falling signal, the driver 130 may maintain the amplitude of the pulse amplitude modulation signal when the first and fourth toggle signals 121 and 126 are added.

In addition, the driver 130 may increase the amplitude of the pulse amplitude modulation signal by adding at least one of the first and third toggle signals 122 and 125 to the combined value of the first and second signals 121 and 124, and may reduce the amplitude of the pulse amplitude modulation signal by adding at least one of the second and fourth toggle signals 124 and 126 to the combined value of the first and second signals 121 and 124.

In addition, the driver 130 may control voltage supply to a toggle modulator configured to treat at least one toggle signal to control a gain according to amplitude modulation. Constituents controlling the gain according to amplitude modulation are additionally described with reference to FIG. 3.

According to another embodiment of the present disclosure, the data transmission device 100 includes a signal generator 110.

The signal generator 110 may generate a pulse amplitude modulation signal including data, and may transmit the generated pulse amplitude modulation signal to a toggle serializer.

In addition, the signal generator 110 may transmit the generated pulse amplitude modulation signal to the toggle serializer 120.

According to another embodiment of the present disclosure, the toggle serializer 120 further includes a signal aligner (not shown) configured to align the first and second signals 121 and 124 at a predetermined phase interval.

The signal aligner (not shown) may serialize a pulse amplitude modulation signal including the first and second signals 121 and 124 transmitted from the signal generator 110 into a data stream at a predetermined phase interval on a signal-by-signal basis. For example, the predetermined phase interval may include 45 degrees, 90 degrees, 125 degrees, etc. That is, the toggle serializer 120 may detect logic level change in the first and second signals 121 and 124 respectively aligned at a 90 degree interval and may generate a toggle signal.

Figure 1B:
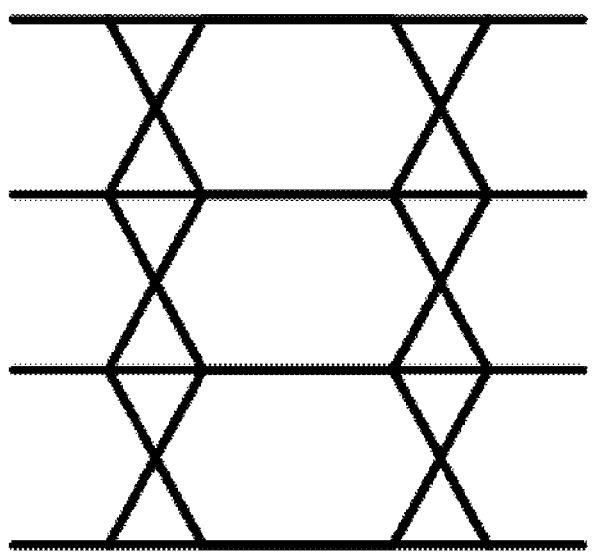
FIGS. 1B and 1C illustrate a PAM-4 signal and pre-emphasized PAM-4 signal transmitted by a data transmission device according to an embodiment of the present disclosure.
Figure 1C:
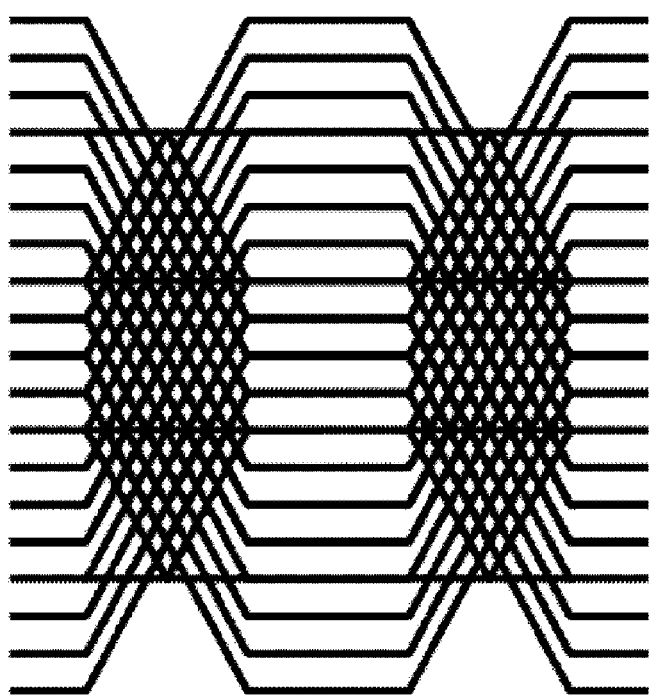

FIGS. 1B and 1C illustrate a PAM-4 signal and pre-emphasized PAM-4 signal transmitted by a data transmission device according to an embodiment of the present disclosure.

Referring to FIG. 1B, exemplifies a PAM-4 signal to which the data transmission device does not apply pre-emphasis.

Referring to FIG. 1C, exemplifies a PAM-4 signal to which the data transmission device applies pre-emphasis using a toggle serializer. That is, FIG. 1C exemplifies a PAM-4 signal, the amplitude of which the data transmission device modulates using the toggle serializer.

Figure 2:
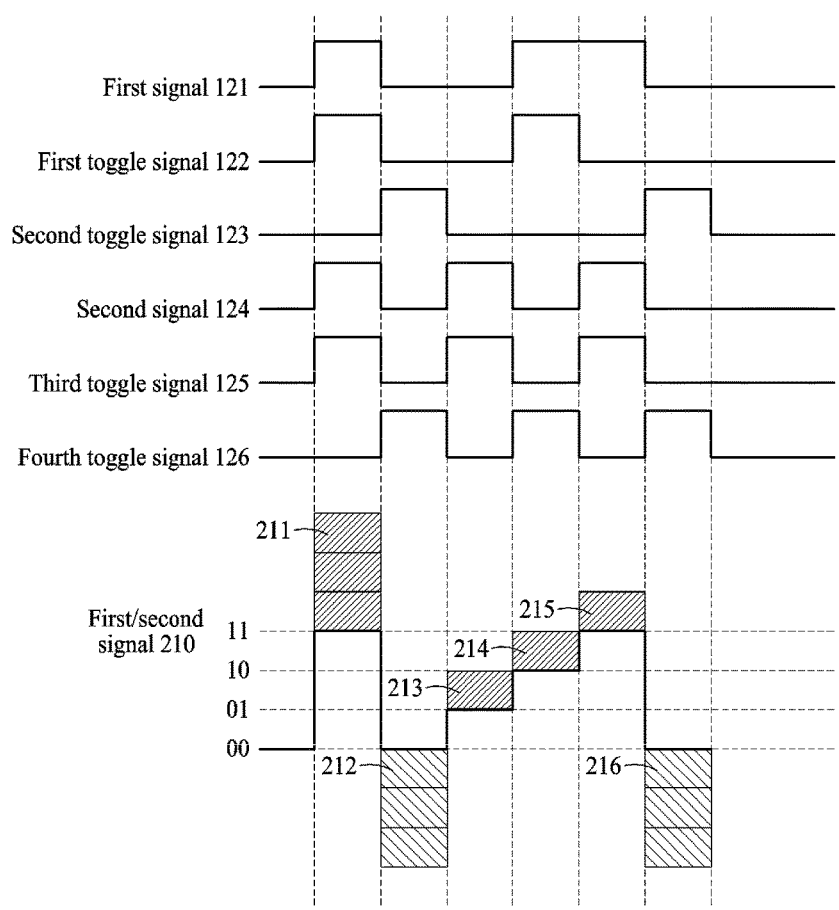
FIG. 2 illustrates a timing diagram describing amplitude modulation of a PAM-4 signal transmitted by a data transmission device according to an embodiment of the present disclosure.

FIG. 2 illustrates a timing diagram describing amplitude modulation of a PAM-4 signal transmitted by a data transmission device according to an embodiment of the present disclosure.

In particular, FIG. 2 exemplifies a timing diagram for describing toggle signal generation according to logic level change in the first and second signals 121 and 124 in the toggle serializer and amplitude modulation of the pulse amplitude modulation signal according to application of the toggle signal.

In the following description, affirmation may include "1" and "rise," and negation may include "0" and "fall".

First, examining logic level change in the first signal 121, negation is converted to affirmation through rise, the affirmation is re-converted to negation, the re-converted negation is maintained for a certain period and then re-converted to affirmation through rise, the re-converted affirmation is maintained for a certain period and then is re-converted to negation.

Here, the first toggle signal 122 may be generated at a moment at which the logic level of the first signal 121 is converted from negation to affirmation, and the second toggle signal 123 may be generated at a moment at which the logic level of the first signal 121 is converted from affirmation to negation.

For example, the toggle serializer generates the first toggle signal 122 when the logic level of the first signal 121 is converted from negation to affirmation, and the toggle serializer generates the second toggle signal 123 when the logic level of the first signal 121 is converted from affirmation to negation. However, when the logic level of the first signal 121 is identically maintained without change, the toggle serializer does not generate a toggle signal.

Next, examining logic level change in the second signal 124, negation is converted to affirmation through rise, the converted affirmation is converted to negation, the converted negation is re-converted to affirmation, the re-converted affirmation is re-converted to negation, and the re-converted negation is re-converted to affirmation.

Here, the third toggle signal 125 may be generated at a moment at which the logic level of the second signal 124 is converted from negation to affirmation, and the fourth toggle signal 126 may be generated at a moment at which the logic level of the second signal 124 is converted from affirmation to negation.

That, is the third toggle signal 125 may be generated by the toggle serializer when the logic level of the second signal 124 rises, and the fourth toggle signal 126 may be generated by the toggle serializer when the logic level of the second signal 124 falls.

For example, in the timing diagram illustrated in FIG. 2, the first, second, third, and fourth toggle signals 122, 123, 125, and 126 may be generated by the toggle serializer. In addition, in the timing diagram illustrated in FIG. 2, a first/second signal 210 may be generated by the driver 130, and the first/second signal 210 may be a signal, the amplitude of which is modulated by adding at least one toggle signal to a combined value, which is combined in the driver 130, of the first and second signals 121 and 124.

For example, in the timing diagram showing the first/second signal 210, the first toggle signal 122 may represent a value of +2, and the second toggle signal 123 may represent a value of −2.

In addition, in the timing diagram showing the first/second signal 210, the third toggle signal 125 may represent a value of +1, and the fourth toggle signal 126 may represent a value of −1.

Now, each section of the first/second signal 210 is described. First, in a first section in which the first and third toggle signals 122 and 125, which allow amplitude increase by being added to a combined value of the first and second signals 121 and 124 corresponding to a section in which the logic level of the first signal 121 and the logic level of the second signal 124 represent affirmation, are located, the driver may generate a signal, the amplitude of which is increased by an increased signal 211 by combining the first signal 121, the second signal 124, and the first and third toggle signals 122 and 125.

Next, in a second section in which the second and fourth toggle signals 123 and 126, which allow amplitude reduction by being added to the combined value of the first and second signals 121 and 124 in a section in which the logic level of the first and second signals 121 and 124 represents negation, are located, the driver may generate a signal, the amplitude of which is reduced by a reduced signal 212 by combining the first signal 121, the second signal 124, and the second and fourth toggle signals 123 and 126.

Next, in a third section in which the logic level of the first signal 121 represents negation, the logic level of the second signal 124 represents affirmation, and the third toggle signal 125 is only present, the driver may generate a signal, the amplitude of which is increased by an increased signal 213 by combining the first signal 121, the second signal 124, and the third toggle signal 125.

Next, in a fourth section in which the logic level of the first signal 121 represents affirmation to generate the first toggle signal 122 and the logic level of the second signal 124 represents negation to generate the fourth toggle signal 126, the driver may generate a signal, the amplitude of which is increased by an increased signal 214 by combining the first signal 121, the second signal 124, the first toggle signal 122, and the fourth toggle signal 126.

Next, in a fifth section in which the logic level of the first signal 121 represents affirmation, but does not generate the first toggle signal 122 because it is the same as in the previous section, and the logic level of the second signal 124 is converted to affirmation to generate the third toggle signal 125, the driver may generate a signal, the amplitude of which is increased by an increased signal 215 by combining the first signal 121, the second signal 124, and the third toggle signal 125.

Finally, in a sixth section in which the first signal 121 and the second signal 124 represent negation, the first and second signals 121 and 124 are converted from affirmation to negation and, accordingly, are respectively related to the second and fourth toggle signals 123 and 126, and the driver may generate a signal, the amplitude of which is reduced by a reduced signal 216 according to the second and fourth toggle signals 123 and 126.

In addition, the driver may adjust amplitude increase magnitude according to the magnitude of DC voltage regardless of the magnitude of a signal.

Referring to FIG. 2, when the first signal 121, the second signal 124, and the at least one toggle signal are combined as described above, 2 bits of information may be displayed and four logic levels 00, 01, 10, and 11 may present in one time section.

Accordingly, since a bandwidth for data transmission may be efficiently used according to an embodiment, low-power implementation of a device may be accomplished and integration thereof may be increased.

Referring to FIG. 2 again, by adding the toggle signal to the signal with which the first signal and a second signal are combined, the amplitude of the pulse amplitude modulation signal may be emphasized to correspond to the logic level change of the first signal and the logic level change of the second signal.

For example, in the first time section of FIG. 2, the logic level of the first/second signal 210 is changed from "00" to "11". To emphasize this, the driver may increase the amplitude of a Pulse Amplitude Modulation (PAM) signal by a variation width of the logic level as indicated by reference symbol 211.

Similarly, the driver may increase the amplitude of the PAM signal to correspond to the logic level change of the first signal and the logic level change of the second signal by adding at least one of the first and third toggle signals to the combined value of the first and second signals.

In addition, the driver may reduce the amplitude of the PAM signal to correspond to the logic level change of the first signal and the logic level change of the second signal by adding at least one of the second and fourth toggle signals to the combined value of the first and second signals.

Figure 3:
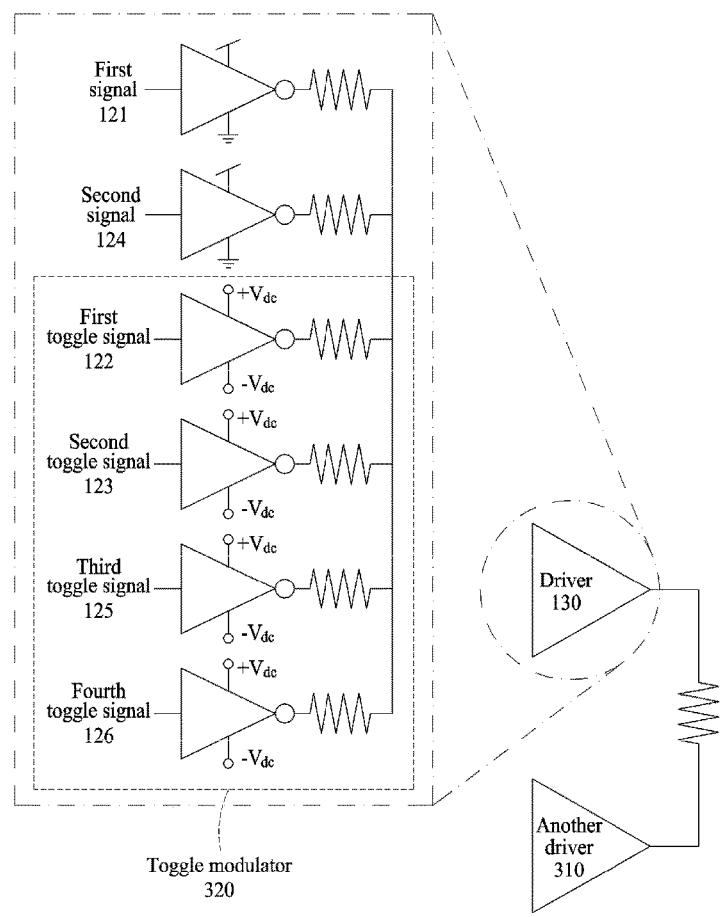
FIG. 3 illustrates a block diagram of a driver according to an embodiment of the present disclosure.

FIG. 3 illustrates a block diagram of a driver according to an embodiment of the present disclosure.

In particular, FIG. 3 exemplifies detailed components of the driver.

Referring to FIG. 3, the driver 130 may have a structure different from another driver 310. A data transmission device may improve a data transmission rate through the different structures of the driver 130 and the other driver 310. For example, the other driver 310 may have the same circuit structure as the driver 130.

In addition, the driver 130 and the other driver 310 may be constituted of resistances that maintain 50 ohm matching with each other and thus finally maintain 100 ohms.

According to an embodiment of the present disclosure, the driver 130 may be constituted of inverters configured to receive input of the first signal 121, the second signal 124, and the first, second, third, and fourth toggle signals 122, 123, 125, and 126.

The driver 130 may simultaneously receive input of the first signal 121, the second signal 124, the first, second, third, and fourth toggle signals 122, 123, 125, and 126, and may simultaneously process the same.

The driver 130 may include a toggle modulator 320. In addition, the toggle modulator 320 may include inverters configured to receive input of the first, second, third, and fourth toggle signals 122, 123, 125, and 126.

According to an embodiment of the present disclosure, the driver 130 may control a gain according to the amplitude modulation of the pulse amplitude modulation signal by controlling voltage supplied to at least one toggle modulator.

That is, the driver 130 may adjust a gain of pre-emphasis while maintaining 50 ohm matching according to change of supply voltage of inverters corresponding to the toggle modulator 320 to which the first to fourth toggle signals 122, 123, 125, and 126 are input.

Here, although not illustrated in FIG. 3, at a front end of each of the inverters included in the toggle modulator 320, an additional inverter circuit for impedance matching may be further included.

Here, the additional inverter may also be controlled by the same supply voltages, $+V_{dc}$ and $-V_{dc}$, as in the inverters included in the toggle modulator 320.

Here, by adjusting $+V_{dc}$ and $-V_{dc}$ of the inverter for impedance matching, impedance matching may be maintained.

The supply voltage control for impedance matching according to an embodiment may be accomplished by fixing $+V_{dc}$ and adjusting $-V_{dc}$.

Here, when $+V_{dc}$ is fixed and $-V_{dc}$ is adjusted for impedance matching, it is advantageous to perform impedance matching while maintaining linearity during high-speed operation.

Figure 4:
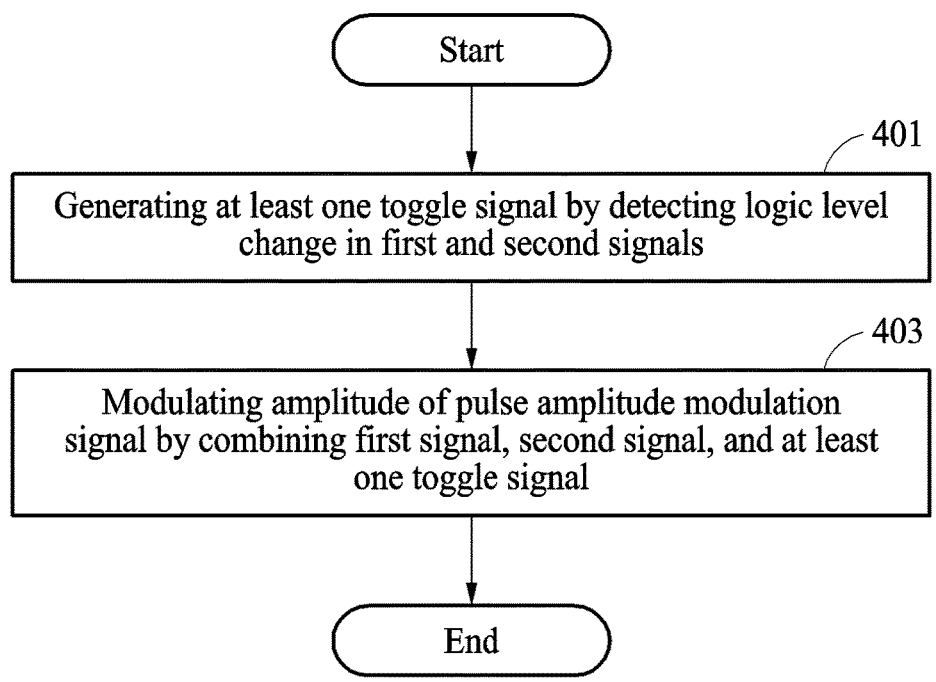
FIGS. 4 and 5 illustrate flowcharts related to a method of operating a data transmission device according to an embodiment of the present disclosure.

FIG. 4 illustrates flowcharts related to a method of operating a data transmission device according to an embodiment of the present disclosure.

In particular, FIG. 4 exemplifies a method of operating the data transmission device characterized by detecting logic level change in the first and second signals to generate a toggle signal, and combining the generated toggle signal with the first and second signals to modulate the amplitude of a pulse amplitude modulation signal.

Referring to FIG. 4, in step 401, the method of operating the data transmission device is characterized by detecting logic level change in first and second signals to generate at least one toggle signal.

That is, according to the method of operating the data transmission device, when a logic level in a previous section of the first signal is compared with a logic level in a current section thereof, and the logic level in the current section rises compared to that in the previous section, a first toggle signal is generated. When the logic level in the current section falls compared to that in the previous section, a second toggle signal is generated. When the logic level in the current section is the same as in the previous section, a toggle signal might not be generated.

In addition, according to the method of operating the data transmission device, when a logic level in a previous section of a second signal is compared with a logic level in a current section thereof, and the logic level in the current section rises compared to that in the previous section, a third toggle signal may be generated. When the logic level in the current section falls compared to that in the previous section, a fourth toggle signal may be generated.

Subsequently, in step 403 according to the method of operating the data transmission device, the first signal, the second signal, and at least one toggle signal are combined to modulate the amplitude of the pulse amplitude modulation signal.

That is, according to the method of operating the data transmission device, in a first time section in which the logic level of the first signal and the logic level of the second signal rise, the first and third toggle signals may be added to a combined value of the first and second signals to increase the amplitude of the pulse amplitude modulation signal.

In addition, according to the method of operating the data transmission device, in a second time section in which the logic level of the first signal rises and the logic level of the second signal falls, first and fourth toggle signals may be added to the combined value of the first and second signals to modulate the amplitude of the pulse amplitude modulation signal. Here, increase and decrease of the first and fourth toggle signals are cancelled, so that the amplitude of the pulse amplitude modulation signal may be maintained.

In addition, according to the method of operating the data transmission device, in a third time section in which the logic level of the first signal falls and the logic level of the second signal rises, the second and third toggle signals may be added to the combined value of the first and second signals to modulate the amplitude of the pulse amplitude modulation signal. Here, increase and decrease of the second and third toggle signals are cancelled, so that the amplitude of the pulse amplitude modulation signal may be maintained.

Further, according to the method of operating the data transmission device, in a fourth time section in which the logic level of the first signal and the logic level of the second signal fall, the second and fourth toggle signals may be added to the combined value of the first and second signals to reduce the amplitude of the pulse amplitude modulation signal.

Figure 5:
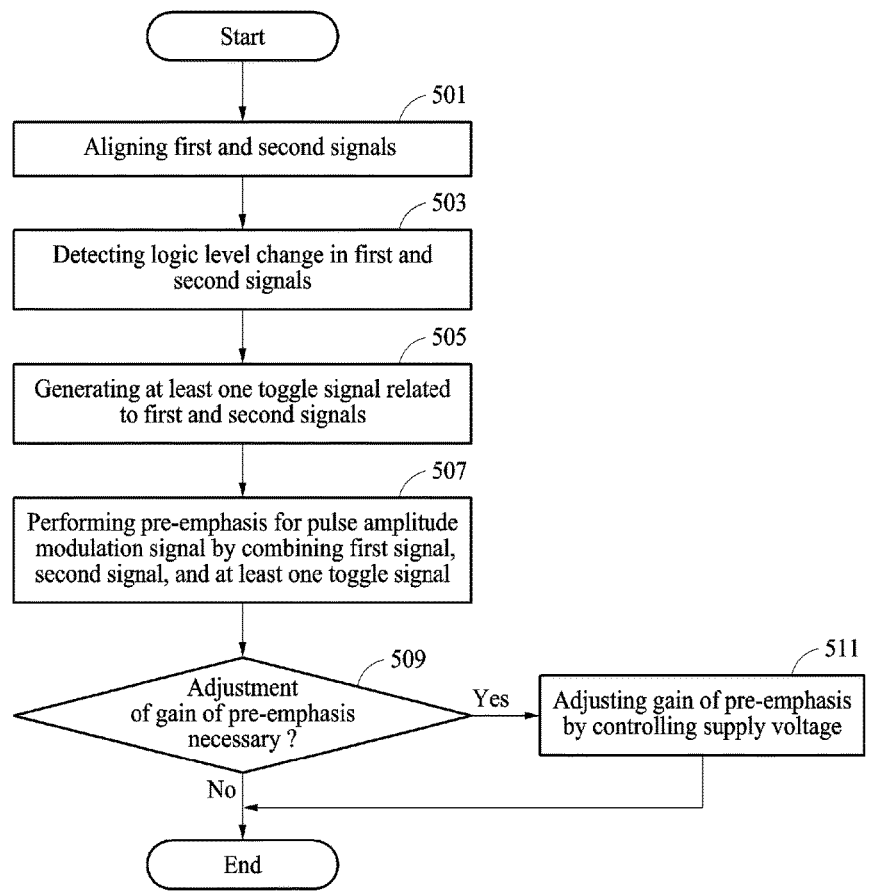

FIG. 5 illustrates flowcharts related to a method of operating a data transmission device according to an embodiment of the present disclosure.

In particular, FIG. 5 exemplifies the method of operating the data transmission device characterized by performing pre-emphasis for a pulse amplitude modulation signal using at least one signal generated according to logic level change in the first and second signals. For example, the pre-emphasis performance for the pulse amplitude modulation signal may include an operation of modulating the amplitude of the pulse amplitude modulation signal.

Referring to FIG. 5, in step 501, according to the method of operating the data transmission device, the first and second signals are aligned. First and second signals included in a pulse amplitude modulation signal generated by the signal generator may be respectively aligned along a time axis at a predetermined phase interval. For example, the predetermined phase interval may include 45 degrees, 90 degrees, 180 degrees, etc.

In step 503, according to the method of operating the data transmission device, logic level change in the first and second signals is detected. According to the method of operating the data transmission device, first and second logic levels of the first signal may be designated, and a change from the first logic level to the second logic level may be detected. For example, when the first logic level is negation and the second logic level is affirmation, a logic level may be determined to rise according to the method of operating the data transmission device. In addition, when the first logic level is affirmation and the second logic level is negation, a logic level may be determined to fall according to the method of operating the data transmission device. Here, the first logic level may be located before the second logic level on a time axis representing the logic level change in the first signal. The above embodiment may be identically applied to the second signal.

In step 505, according to the method of operating the data transmission device, at least one toggle signal related to the first and second signals may be generated.

According to the method of operating the data transmission device, a first toggle signal is generated when the logic level of the first signal rises, a second toggle signal is generated when the logic level of the first signal falls, a third toggle signal is generated when the logic level of the second signal rises, and a fourth toggle signal may be generated when the logic level of the second signal falls.

In step 507, according to the method of operating the data transmission device, the first signal, the second signal, and at least one toggle signal may be combined to perform pre-emphasis for a pulse amplitude modulation signal.

That is, according to the method of operating the data transmission device, a toggle signal generated in a specific section may be combined with a combined value of the first and second signals in a specific section to perform pre-emphasis for the pulse amplitude modulation signal.

For example, according to the method of operating the data transmission device, in a section in which the logic level of the first signal rises so that the logic level of the first signal is affirmation, and the logic level of the second signal rises so that the logic level of the second signal is affirmation, first and third toggle signals generated in a corresponding section are combined with the first and second signals to perform pre-emphasis for a pulse amplitude modulation signal. Additional embodiments are illustrated in FIG. 1 or 2.

In step 509, according to the method of operating the data transmission device, whether a gain of the pre-emphasis is adjusted is determined. For example, according to the method of operating the data transmission device, whether a swing magnitude of the amplitude according to a plurality of resistances should be controlled is determined.

In another embodiment of the present disclosure according to the method of operating the data transmission device, when adjustment of the gain of the pre-emphasis is determined to be unnecessary, a corresponding procedure is terminated. However, when the pre-emphasis gain adjustment is determined to be necessary according to the method of operating the data transmission device, step 511 is performed.

In step 511, according to the method of operating the data transmission device, a supply voltage is controlled to adjust the gain of the pre-emphasis. According to the method of operating the data transmission device, the gain of the pre-emphasis corresponding to a gain according to the amplitude modulation of the pulse amplitude modulation signal may be adjusted by controlling voltage supplied to inverters to which at least one toggle signal from the driver is transmitted.

As apparent from the above description, a data transmission device according to an embodiment of the present disclosure may detect logic level change in MSB and LSB signals from a pulse amplitude modulation signal including the MSB and LSB signals to generate at least one toggle signal related to the MSB and LSB signals.

In addition, according to an embodiment of the present disclosure, the data transmission device may combine the MSB signal, the LSB signal, and the at least one toggle signal to modulate the amplitude of the pulse amplitude modulation signal.

In addition, according to an embodiment of the present disclosure, the data transmission device may secure a power and structural gain for pre-emphasis of a PAM-4 signal by performing pre-emphasis using at least one toggle signal generated through a toggle serializer.

In addition, according to an embodiment of the present disclosure, the data transmission device may adjust the gain of the pre-emphasis utilizing a Source-Series Terminated (SST) driver.

Further, according to an embodiment of the present disclosure, the data transmission device may secure electric channel compensation and power area gain through a simple configuration without an additional hardware by performing the pre-emphasis of the PAM-4 signal using a toggle serializer.

The embodiments disclosed in the claims and the specification of the present disclosure may be implemented by hardware, software, or a combination of hardware and software.

Such software may be stored in a computer-readable storage medium. The computer-readable storage medium stores at least one program (software module), i.e., at least one program including instructions for the wearable headset device to execute the method of the present disclosure when the wearable headset device is driven by at least one processor.

Such software may be stored in a volatile storage device, or a non-volatile device such as Read Only Memory (ROM); in memory such as random access memory (RAM), a memory chip, a device, or an integrated circuit; or in an optical or magnetic readable medium such as a Compact Disc-ROM (CD-ROM), a Digital Versatile Disc (DVD), a magnetic disk, or a magnetic tape.

The storage devices and storage media are examples of machine-readable storage means suitable for storing a program(s) which include instructions implementing embodiments when executed.

These examples provide a program including code to implement a device or method claimed by any one of the claims of the specification, or a machine-readable storage medium storing the program.

Further, such a program may be electronically transmitted by any medium, such as a communication signal transmitted through wired or wireless connection, and embodiments thereof include equivalents thereof.

In the aforementioned embodiments, constituents of the present disclosure were expressed in a singular or plural form depending upon embodiments thereof.

However, the singular or plural expressions should be understood to be suitably selected depending upon a suggested situation for convenience of description, and the aforementioned embodiments should be understood not to be limited to the disclosed singular or plural forms. In other words, it should be understood that plural constituents may be a singular constituent or a singular constituent may be plural constituents.

While the embodiments of the present disclosure have been described, those skilled in the art will appreciate that many modifications and changes can be made to the present disclosure without departing from the spirit and essential characteristics of the present disclosure.

Therefore, it should be understood that there is no intent to limit the disclosure to the embodiments disclosed, rather, the disclosure is to cover all modifications, equivalents, and alternatives falling within the spirit and scope of the disclosure as defined by the claims.

[Description of Symbols]

| | |
|---|---|
| 100: Data transmission device | 110: Signal generator |
| 120: Toggle serializer | 121: First signal |
| 122: First toggle signal | 123: Second toggle signal |
| 124: Second signal | 125: Third toggle signal |
| 126: Fourth toggle signal | 130: Driver |
| 310: Other driver | 320: Toggle modulator |

What is claimed is:

1. A data transmission device, comprising:
a signal generator configured to generate a Pulse Amplitude Modulation (PAM) signal comprising a first signal and a second signal;
a toggle serializer configured to generate at least one toggle signal by detecting logic level change of the first and second signals; and
a driver configured to receive the first signal, the second signal, and the at least one toggle signal and generate an output signal by combining the first signal, the second signal, and the at least one toggle signal,
wherein the first signal includes a Most Significant Byte (MSB) signal among the PAM signal,
wherein the second signal includes a Least Significant Byte (LSB) signal among the PAM signal, and
wherein the toggle serializer generates a first toggle signal of the at least one toggle signal when a logic level of the first signal rises, generates a second toggle signal of the at least one toggle signal when the logic level of the first signal falls, generates a third toggle signal of the at least one toggle signal when a logic level of the second signal rises, and generates a fourth toggle signal of the at least one toggle signal when the ionic level of the second signal falls.

2. The data transmission device according to claim 1, wherein the first toggle signal comprises a toggle-rising signal related to the MSB signal,
the second toggle signal comprises a toggle-falling signal related to the MSB signal,
the third toggle signal comprises a toggle-rising signal related to the LSB signal, and
the fourth toggle signal comprises a toggle-falling signal related to the LSB signal.

3. The data transmission device according to claim 1, wherein the toggle serializer further comprises a signal aligner configured to respectively align the first signal and the second signal at a predetermined phase interval.

4. The data transmission device according to claim 1, wherein the toggle serializer generates the first toggle signal when a first logic level is negation and a second logic level is affirmation, upon detection of logic level change in the first signal; generates the second toggle signal when the first logic level is affirmation and the second logic level is negation, upon detection of logic level change in the first signal; upon detection of logic level change in the first signal; generates the third toggle signal when a third logic level is negation and a fourth logic level is affirmation, upon detection of logic level change in the second signal; and generates the fourth toggle signal when the first logic level is affirmation and the second logic level is negation, upon detection of logic level change in the second signal.

5. The data transmission device according to claim 4, wherein the first logic level is located before the second logic level on a time axis representing logic level change in the first signal, and the third logic level is located before the fourth logic level on a time axis representing logic level change in the second signal.

6. The data transmission device according to claim 1, wherein the driver adds the first and third toggle signals to a combined value of the first and second signals in a first time section in which a logic level of the first signal and a logic level of the second signal rise; adds the first and fourth toggle signals to a combined value of the first and second signals in a second time section in which a logic level of the first signal rises and a logic level of the second signal falls; adds the second and third toggle signals to a combined value of the first and second signals in a third time section in which a logic level of the first signal falls and a logic level of the second signal rises; and adds the second and fourth toggle signals to a combined value of the first and second signals in a fourth time section in which a logic level of the first signal and a logic level of the second signal fall.

7. The data transmission device according to claim 6, wherein the driver adds at least one of the first and third toggle signals to the combined value of the first and second signals to generate the output signal of which amplitude is increased; and adds at least one of the second and fourth toggle signals to the combined value of the first and second signals to generate the output signal of which amplitude is reduced.

8. The data transmission device according to claim 6, wherein the driver adds the first and fourth toggle signals to the combined value of the first and second signals to generate the output signal of which amplitude is maintained.

9. The data transmission device according to claim 1, wherein the driver further comprises at least one toggle modulator configured to receive an input of the at least one toggle signal.

10. The data transmission device according to claim 9, wherein the driver controls a gain by controlling voltage supplied to the at least one toggle modulator.

11. A method of operating a data transmission device, the method comprising:

generating a Pulse in Amplitude Modulation (PAM) signal comprising a first signal and a second signal by a signal generator;

generating at least one toggle signal by detecting logic level change of the first and second signals by a toggle serializer; and receiving the first signal, the second signal, and the at least one toggle signal by a driver and generating an output signal by combining the first signal, the second signal, and the at least one toggle signal by the driver, wherein the first signal includes a Most Significant Byte (MSB) signal among the PAM signal, wherein the second signal includes a Least Significant Byte (LSB) signal among the PAM signal, and wherein the generating the at least one toggle signal comprises:

generating, by the toggle serializer, a first toggle signal of the at least one toggle signal when a logic level of the first signal rises;

generating, by the toggle serializes, a second toggle signal of the at least one toggle signal when the logic level of the first signal falls;

generating, by the toggle serializes, a third toggle signal of the at least one toggle signal by the toggle serializer when a logic level of the second signal rises; and generating, by the toggle serializer, a fourth toggle signal of the at least one toggle signal when the logic level of the second signal falls.

12. The method according to claim 11, wherein the generating the output signal comprises:

adding the first and third toggle signals to a combined value of the first and second signals in a first time section, in which a logic level of the first signal and a logic level of the second signal rise by the driver;

adding the first and fourth toggle signals to a combined value of the first and second signals in a second time section, in which a logic level of the first signal rises and a logic level of the second signal falls, by the driver;

adding the second and third toggle signals to a combined value of the first and second signals in a third time section, in which a logic level of the first signal falls and a logic level of the second signal rises, by the driver; and adding the second and fourth toggle signals to a combined value of the first and second signals in a fourth time section, in which a logic level of the first signal and a logic level of the second signal fall, by the driver.

13. The method according to claim 11, wherein the generating the output signal comprises controlling a gain by controlling voltage, which is supplied to at least one toggle modulator receiving an input of the at least one toggle signal, by the driver.

* * * * *